United States Patent
Blessing et al.

(10) Patent No.: US 8,274,186 B2
(45) Date of Patent: Sep. 25, 2012

(54) HYBRID DRIVE TRAIN AND ELECTRICAL MACHINE

(75) Inventors: Uli Christian Blessing, Heilbronn (DE);
Bernd Blankenbach, Heilbronn (DE);
Benjamin Kesel, Boxberg (DE);
Winfried Schulz, Pullheim (DE); Kevin Gutmann, Untergruppenbach (DE);
Matthias Doelling, Bergisch Gladbach (DE); Mark Absenger, Wuppertal (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 284 days.

(21) Appl. No.: 12/832,007

(22) Filed: Jul. 7, 2010

(65) Prior Publication Data
US 2011/0057522 A1    Mar. 10, 2011

(30) Foreign Application Priority Data
Aug. 12, 2009   (DE) .................. 10 2009 037 008

(51) Int. Cl.
*H02K 7/10*   (2006.01)
(52) U.S. Cl. ............................... 310/78; 310/61; 310/76
(58) Field of Classification Search .......... 310/61, 310/76–79, 75 D; 180/65.22
See application file for complete search history.

(56) References Cited

U.S. PATENT DOCUMENTS

| | | | | |
|---|---|---|---|---|
| 5,513,719 A | * | 5/1996 | Moroto et al. | 180/65.21 |
| 6,273,211 B1 | * | 8/2001 | Engels et al. | 180/446 |
| 6,394,924 B1 | * | 5/2002 | Schiebold et al. | 475/5 |
| 7,410,436 B2 | * | 8/2008 | Van Druten et al. | 475/5 |
| 7,631,739 B2 | * | 12/2009 | Enstrom | 192/48.609 |
| 7,637,333 B2 | * | 12/2009 | Grundl et al. | 180/65.22 |
| 7,900,763 B2 | * | 3/2011 | Paumier et al. | 192/85.51 |
| 8,122,781 B2 | * | 2/2012 | Minke et al. | 74/405 |
| 8,197,373 B2 | * | 6/2012 | Akutsu et al. | 475/5 |
| 2009/0066169 A1 | * | 3/2009 | Schweiher et al. | 310/14 |

FOREIGN PATENT DOCUMENTS

| | | |
|---|---|---|
| DE | 196 18 865 A1 | 11/1997 |
| DE | 199 27 261 A1 | 12/2000 |
| DE | 10 2005 040 771 A1 | 3/2007 |

* cited by examiner

*Primary Examiner* — Thanh Lam
(74) *Attorney, Agent, or Firm* — Knobbe, Martens, Olson & Bear, LLP

(57) ABSTRACT

The present invention relates to a hybrid drive train for a motor vehicle, comprising a clutch arrangement having a first rotatable clutch part and a second rotatable clutch part, which clutch parts can be separated from one another and which can be connected to one another, and comprising an electrical machine which is arranged concentrically with respect to the first clutch part and has a rotor, wherein the rotor is connected with the first clutch part and comprises a plurality of magnetic flux influencing portions, the magnetic flux influencing portions being arranged distributed over the circumference of the rotor with a predetermined rotor pitch. Here, the first clutch part comprises a shaft toothing that is adapted to the rotor pitch.

16 Claims, 5 Drawing Sheets

HYBRID DRIVE TRAIN AND ELECTRICAL MACHINE

CROSS-REFERENCE TO RELATED APPLICATIONS

This application claims the priority of German patent application DE 10 2009 037 008, filed Aug. 12, 2009.

BACKGROUND OF THE INVENTION

The present invention relates to a hybrid drive train for a motor vehicle, comprising a clutch arrangement having a first rotatable clutch part and a second rotatable clutch part, which clutch parts can be separated from one another and can be connected to one another, and comprising an electrical machine which is arranged concentrically with respect to the first clutch part and has a rotor, wherein the rotor is connected with the first clutch part and comprises a plurality of magnetic flux influencing portions, the magnetic flux influencing portions being arranged distributed over the circumference of the rotor with a predetermined rotor pitch.

The present invention, further, relates to an electrical machine having an outer stator and an inner rotor, wherein the electrical machine can be used particularly in such a drive train.

In the field of drive trains for motor vehicles, so-called hybrid drive trains have been very popular for several years. Such hybrid drive trains include typically two drive sources, one of which being an electrical machine. The other drive source may, for example, be a conventional drive motor, such as a combustion engine. The electrical machine can be operated typically as a motor in order to provide drive power. Further, the electrical machine can be operated as a generator, for example to charge a connected battery by means of regenerative braking during trailing-throttle operation.

The electrical machine can be connected in many different ways to a conventional drive train. It has proven particularly advantageous if the electrical machine is arranged concentrically to a clutch of the drive train. In this respect it is known for example from document DE 10 2005 040 771 A1, to form the rotor carrier of the electrical machine as an outer disk carrier of a multi-disk clutch.

In recent years, the use of such multi-disk clutches in drive trains of motor vehicles has increased. This type of clutch can transfer high torques, particularly, if these multi-disk clutches are cooled actively by means of a fluid (e.g. oil).

The use of active cooling of the clutch disks for the rotor carrier is known from the above-mentioned document.

The arrangement of the electrical machine in a manner concentric to a clutch, particularly in the available space between a combustion engine and a step-transmission, leads to increased demands with respect to a compact layout and with respect to efficient cooling.

BRIEF SUMMARY OF THE INVENTION

Against the above background it is the objective of the invention to provide an improved hybrid drive train for a motor vehicle as well as an improved electrical machine that can be used particularly in such a drive train.

The above object is solved by a hybrid drive train for a motor vehicle, comprising a clutch arrangement having a first rotatable clutch part and a second rotatable clutch part, which clutch parts can be separated from one another and can be connected to one another, and comprising an electrical machine which is arranged concentrically with respect to the first clutch part and has a rotor, wherein the rotor is connected with the first clutch part and comprises a plurality of magnetic flux influencing portions, the magnetic flux influencing portions being arranged distributed over the circumference of the rotor with a predetermined rotor pitch, wherein the first clutch part comprises a shaft toothing that is adapted to the rotor pitch.

It is possible to optimize the magnetic flux within the rotor by adapting the shaft toothing of the first clutch part to the rotor pitch. Particularly, it is possible to adapt the shape of the shaft toothing to the magnetic flux distribution in such a manner as to achieve a radially compact construction. The shape of the shaft toothing has been constructed in the prior art up to now typically only with respect to an optimization of the transfer forces, whereas the rotor pitch of the electrical machine has been optimized in the prior art with respect to completely different demands. The present invention follows a different route in that the shaft toothing is adapted to the rotor pitch and, vice versa, the rotor pitch is adapted to the shaft toothing.

In an electrical machine having brushes, the magnetic flux influencing portions can be formed by coil arrangements. Preferably, however, the electrical machine is a DC machine without brushes, wherein the magnetic flux influencing portions are formed preferably as permanent magnets. Thereby, the electrical machine can be formed as an electrically commutated machine that has significantly lower wear. Such electrical machines are also known as EC machines and are based on the concept of synchronous machines, although the associated power electronics are operated with DC.

Presently, the term pitch is to be understood as a scaled pitch that relates, e.g., to the respective radius. The rotor pitch, in the present context, is in particular inversely proportional to the number of magnetic flux influencing portions.

An adaptation of the shaft toothing of the clutch part to the rotor pitch is particularly to be understood in that shaft toothing portions (e.g. teeth or tooth gaps) of the shaft toothing are aligned in a circumferential direction with the magnetic flux influencing portions.

In the following, for the sake of simplicity and without loss of generality, the magnetic flux influencing portions are referred to as permanent magnets.

The above objective is hence completely achieved.

It is particularly preferred if the ratio of a toothing pitch of the shaft toothing to the rotor pitch is an integer number.

The toothing pitch is adapted by this measure to the rotor pitch such that an optimized magnetic flux is achievable.

Here, it is particularly preferable, if the ratio of the toothing pitch to the rotor pitch is 1. In this embodiment, a prominent magnet is, for example, associated to a tooth or a tooth gap of the shaft toothing, whereas an area between two permanent magnets is associated to a respective tooth gap or tooth.

According to a further preferred embodiment, the ratio of the circumferential length of shaft toothing portions that are aligned in circumferential direction with a respective magnetic flux influencing portion to the circumferential length of shaft toothing portions that are arranged in the circumferential direction between respective adjacent magnetic flux influencing portions, is chosen such that a magnetic flux from one magnetic flux influencing portion to an adjacent magnetic flux influencing portion is guided essentially past tooth flanks of the shaft toothing.

The distribution or the gradient of the magnetic flux in the rotor can be optimized by this measure. Even if the radial distance between the permanent magnets and the shaft toothing is relatively short so that a radially compact construction is achieved, it can be prevented hereby that the magnetic flux is negatively influenced by the tooth flanks.

According to a further preferred embodiment, the ratio of the circumferential length of respective shaft toothing portions that are aligned in the circumferential direction with a respective permanent magnet, to a circumferential length of shaft toothing portions that are arranged in the circumferential direction between respective adjacent permanent magnets, is in the range from 45:55 to 20:80, particularly from 45:55 to 30:70.

Here, the shaft toothing is arranged such that the circumferential lengths of teeth and those of tooth gaps interposed therebetween are different. Particularly, it can be achieved that a toothing portion (a tooth or a tooth gap) that is aligned in the circumferential direction with a permanent magnet, is smaller in a radial projection than the associated permanent magnet. Hereby, the magnetic flux between adjacent permanent magnets can be guided in a superior manner. Here, it is particularly preferred, if the circumferential length of a toothing portion that is aligned in circumferential direction with a permanent magnet is smaller than the circumferential length of this permanent magnet.

According to a further preferred embodiment, the permanent magnets and the shaft toothing are arranged with respect to each other in circumferential direction such that a magnetic flux from one permanent magnet to an adjacent permanent magnet is guided essentially exclusively through a rotor body of the rotor.

In this embodiment it is preferred, if the shaft toothing, in an area between two adjacent permanent magnet, is formed as a radially receding tooth gap, whereas the shaft toothing comprises radially protruding teeth each of which being in alignment with the respective permanent magnet.

As a consequence, the magnetic flux can enter the rotor body in the tooth gap and can thus be guided in an ideal manner.

It is particularly preferred in this embodiment, if the tooth gap is filled with material of the rotor body in order to guide the magnetic flux in this area without obstructions.

The rotor body is presently a body that consists essentially of a ferromagnetic material to which the permanent magnets are attached. For example, the permanent magnets can be attached to an outer surface of the rotor body. Due to the relatively high rotary speeds, it is preferred, if the permanent magnets are integrated into the rotor body or the embedded therein.

According to an alternative embodiment, the permanent magnets and the shaft toothing are arranged with respect to each other in the circumferential direction such that a magnetic flux from one permanent magnet to an adjacent permanent magnet is guided at least partially through a circumferential portion of the first clutch part, which is arranged there between.

In this embodiment, use is made of the fact that the clutch part, which can for example be formed as a rotor carrier, is typically formed also of a ferromagnetic material and is, thus, generally suitable for guiding a magnetic flux.

In this embodiment, it is also possible to achieve a radially compact construction.

In this embodiment, it is particularly preferred, if the circumferential portion of the first clutch part, which guides the magnetic flux is a tooth of the shaft toothing, i.e. a portion of the shaft toothing that protrudes radially in an outer direction.

As a consequence, the magnetic flux can be guided from one permanent magnet via the rotor body into the circumferential portion of the first clutch part, and from here again via the rotor body to the adjacent permanent magnet. It is also possible here that the magnetic flux is guided through other portions of the first clutch part.

According to a further preferred embodiment, the first clutch part comprises at least one channel that extends in axial direction and via which a fluid can flow against at least a portion of the electrical machine.

This embodiment is to be seen as an invention of its own, independent on the adaptation of the shaft toothing to the rotor pitch.

Here, the fluid is supplied preferably in radial direction from the inside to the outside so that it arrives for example at a location (seen in axial direction) on the inner side of the first clutch part. Due to the channel that extends in axial direction, the fluid can then be guided in axial direction along the clutch part and, for example, along a rotor connected thereto in order to cool the rotor by means of this fluid.

According to a further preferred embodiment, the first clutch part comprises at least one opening which is continuous in radial direction and via which a fluid can flow against at least a portion of the electrical machine.

This embodiment is to be seen as an invention on its own, independent from the adaptation of the shaft toothing to the rotor pitch.

By providing a radial opening in the first clutch part, the electrical machine which is arranged in radial direction on the outside, can be cooled by means of the fluid. For example, the fluid can be guided through such an opening closer towards the rotor, particularly towards the rotor carrier so that a more efficient cooling of the rotor is made possible. Further, it is possible to cool via such a radial opening the stator of the electrical machine.

It is of particular advantage here, if the opening is connected to the channel.

In this embodiment, the opening can be formed also as a longitudinal hole extending in axial direction and aligned with the channel. Such a longitudinal hole can also form the channel itself.

It is further preferred in this embodiment, if the first clutch part protrudes at least on one side thereof with respect to the rotor in the axial direction, wherein the opening is formed in the protruding portion, such that a fluid can flow against a stator of the electrical machine via the opening.

The opening for cooling the stator can be formed as a separate opening in the first clutch part; however, the opening can be part of a longitudinal hole that extends in axial direction and via which fluid is guided in axial direction to the opening.

Overall, it is further preferred, if the clutch is a multi-disk clutch and if the first clutch part comprises an outer disk carrier of the multi-disk clutch, wherein the outer disk carrier is connected with the rotor in circumferential direction via a shaft toothing. In this embodiment, the first clutch includes preferably the outer disk carrier and a plurality of disks that are connected thereto, which are for example connected in this circumferential direction by means of a further shaft toothing with the outer disk carrier.

The outer disk carrier can be formed as a drawn or extrusion-molded shaft profile made of a metallic material, wherein the shaft profile comprises a toothing profile over the whole circumference thereof. In order to connect the toothing profile with a rotor body of the rotor, the toothing profile can comprises a shaft toothing at its outer circumference. Further, the shaft profile can comprise at its inner circumference an inner toothing for connection with disks of the multi-disk clutch. Here, teeth of the inner shaft toothing form tooth gaps of the outer shaft toothing, and vice versa.

According to a further aspect of the present invention, the object is achieved by an electrical machine having an outer stator and an inner rotor, wherein the rotor is coupled in a circumferential direction to a rotor shaft, wherein the stator has a larger width in an axial direction than the rotor, wherein the rotor shaft protrudes at least on one side in the axial direction with respect to the rotor, where at least one radially continuous opening is formed in the protruding portion of the rotor shaft, wherein fluid can flow via the opening against the stator.

Such an electrical machine is particularly useful for a hybrid drive train as mentioned above.

It is self-evident that the features specified above and features yet to be explained below may be used not only in the respectively specified combination but rather also in other combinations or individually without departing from the scope of the present invention.

BRIEF DESCRIPTION OF THE SEVERAL VIEWS OF THE DRAWING

Exemplary embodiments of the invention are illustrated in the drawing and will be explained in more detail in the following description. In the drawing.

DETAILED DESCRIPTION OF THE INVENTION

Figure 1:
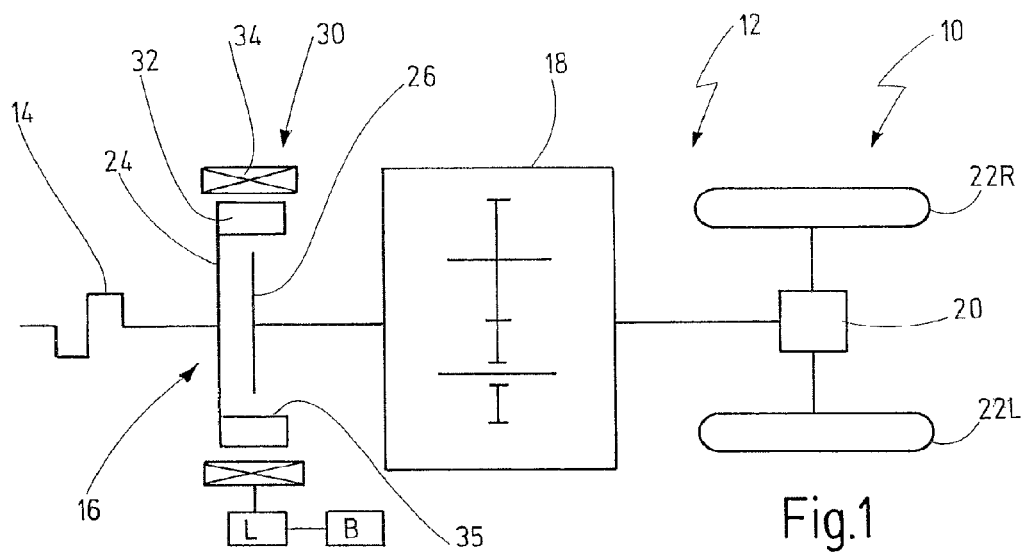
FIG. 1 is a schematic depiction of a first embodiment of an inventive drive train.

A motor vehicle is schematically shown in FIG. 1 and is denoted generally by 10. The motor vehicle 10 comprises a drive train 12. The drive train 12 includes a drive motor 14, for example a combustion engine, a clutch arrangement 16, a step-transmission 18, a differential 20 as well as at least two driven wheels 22L, 22R.

The clutch arrangement 16 is formed as single clutch arrangement and comprises a first clutch part 24, which is connected with the drive motor 14. Further, the clutch arrangement 16 comprises a second clutch part 26, which is connected with an input of the step transmission 18.

The clutch arrangement 16 can be formed as a dry clutch or as a wet-running clutch, e.g. as a multi-disk clutch.

An electrical machine 30 is arranged coaxially with respect to the clutch arrangement 16. The electrical machine 30 comprises a rotor which is connected with the first clutch part 24. Further, the electrical machine 30 comprises a stator 34 that is arranged coaxially on the outside around the rotor 32. The electrical machine 30 is formed as a DC machine without brushes. Correspondingly, the rotor 32 is provided with a plurality of permanent magnets. The stator comprises a plurality of stator coils which are connected with a power electronics L. The power electronics L is connected to a schematically depicted battery B.

Further, the first clutch part 24 comprises a shaft toothing 35 which is adapted to a rotor pitch at which the permanent magnets are arranged distributed over the circumference of the rotor 32.

In the present case, the first clutch part 24 is connected with the drive motor so that the hybrid drive train 12 is designed as a so-called mild hybrid drive train. A two-mass flywheel or a similar element can be arranged between the drive motor 14 and the first clutch part 24, if the need arises.

Figure 2:
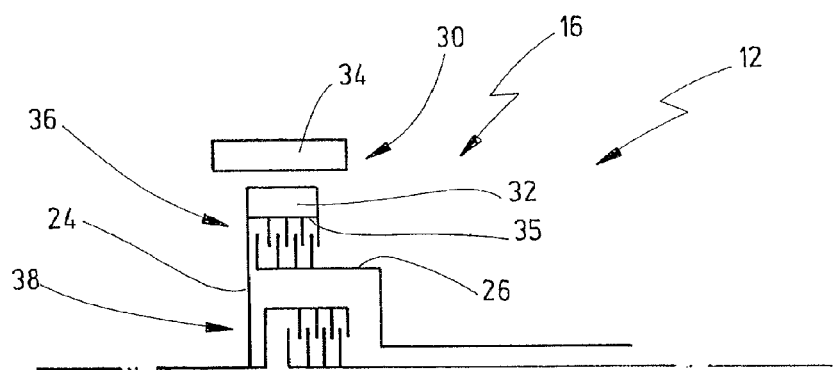
FIG. 2 is a schematic depiction of a clutch arrangement for an inventive drive train.
Figure 3:
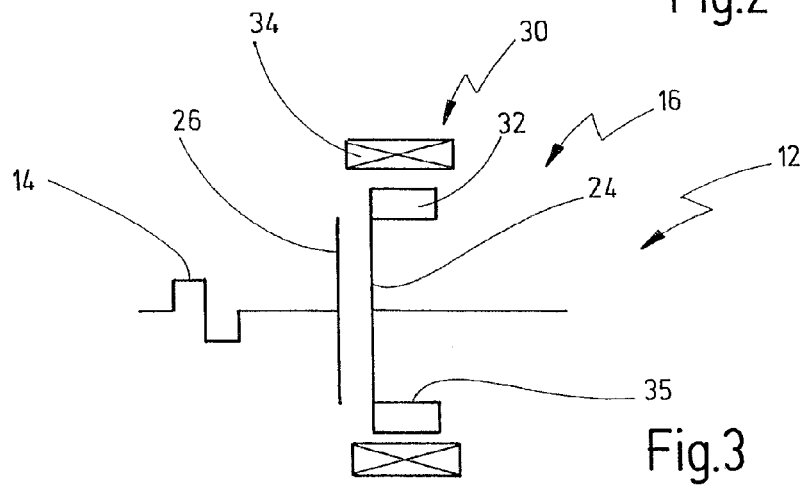
FIG. 3 is a further schematic depiction of a clutch arrangement for an inventive drive train.

FIGS. 2 and 3 show details of alternative embodiments of drive trains 12 according to the invention. These alternative embodiments correspond in terms of design and mode of operation generally to the drive train 12 of FIG. 1. The same elements are therefore denoted by the same reference numerals. Essentially only the differences will be explained below.

In the drive train 12 of FIG. 2, the clutch arrangement 16 comprises a dual-clutch arrangement having a first clutch 36 and a second clutch 38, each of which being designed as a multi-disk clutch. The input members of both clutches 36, 38 are connectible with the drive motor 14. The output members of the two clutches 36, 38 are connected with a step transmission which includes two parallel partial transmissions and forms, together with the clutch arrangement 16, a dual-clutch transmission. An outer disk carrier of the first clutch 36 comprises a shaft toothing 35 and is connected at its outer circumference with the rotor 32 of an electrical machine 30.

In the drive train 12 of FIG. 3, the first clutch part 24, at the outer circumference of which the electrical machine 30 is provided, is connected with the input shaft of the step transmission 18, whereas the second clutch part 26 is connected with the drive motor 14.

Figure 4:
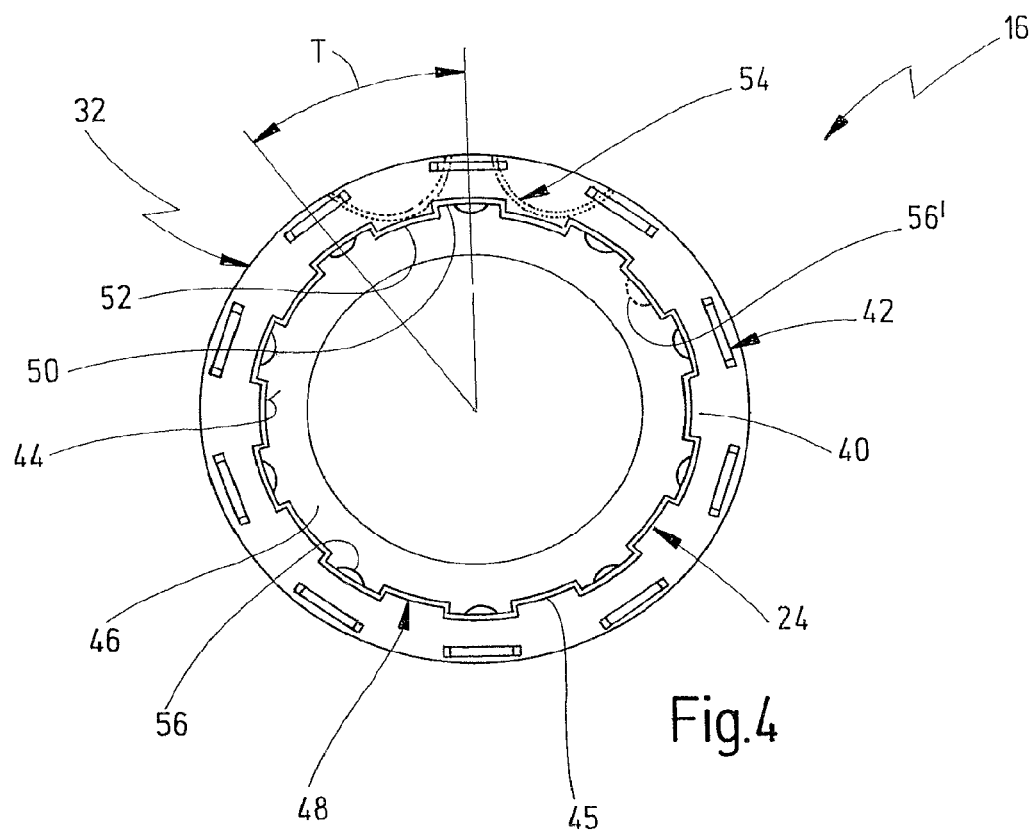
FIG. 4 is a cross-sectional view of a part of a clutch and of a rotor of an electrical machine for an inventive drive train.
Figure 5:
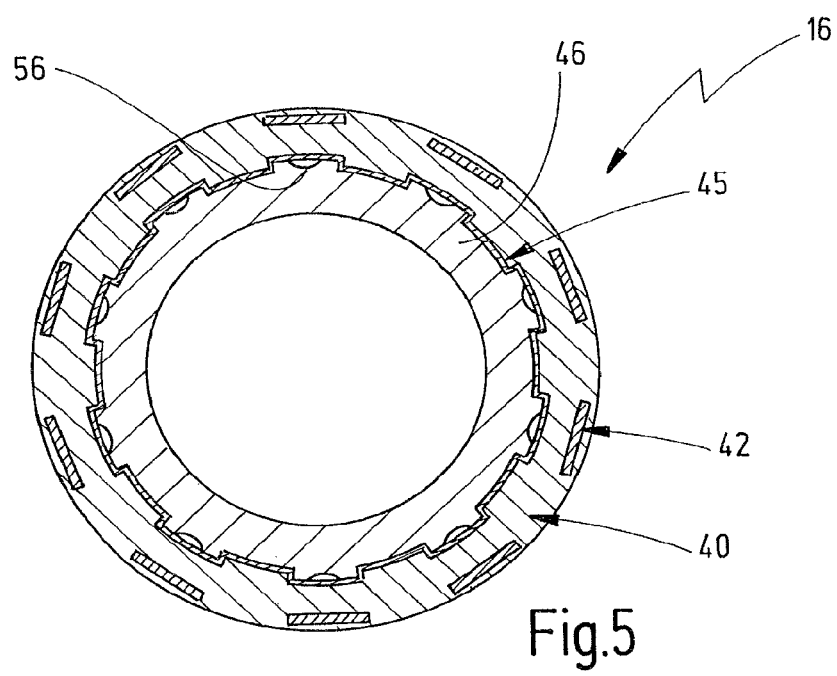
FIG. 5 is a sectional view corresponding to FIG. 4.

FIGS. 4 and 5 show an arrangement of a clutch and a rotor 32. The embodiment of FIGS. 4 and 5 depicts in an exemplary manner how the first clutch part 24 can be provided with a shaft toothing that is adapted to the rotor pitch.

The rotor 32 is formed as an annular element and comprises a rotor body 40 made of a ferromagnetic material. The plurality of permanent magnets 42 are embedded into the rotor body 40, wherein the permanent magnets 42 are arranged distributed over the circumference of the rotor 32. In the present case, ten permanent magnets are provided which are arranged distributed over the circumference with a uniform rotor pitch T. The rotor pitch T is a scaled pitch and is inversely proportional to the number of permanent magnets. The permanent magnets 42 can be arranged such that the north poles and south poles thereof are arranged one after the other in the circumferential direction or in the radial direction.

The clutch arrangement 16 is formed as a multi-disk clutch and comprises a disk carrier 45 that is formed as an outer disk carrier. The disk carrier 45 is an extrusion-molded profile or the like, and is made of a metallic material, particularly a ferromagnetic material. The disk carrier 45 comprises a first shaft toothing 44 that is formed at the inner circumference of the disk carrier 45 and is adapted to establish a connection in circumferential direction with a plurality of clutch disks 46, only one of which being in each case shown in FIGS. 4 and 5. The clutch disks 46 are provided, for this purpose, with a corresponding toothing at their outer circumference, which engages in the first shaft toothing 44.

Further, the disk carrier 45 comprises at its outer side a second shaft toothing 48, by means of which the rotor body 40 is connected in circumferential direction with the disk carrier 45. To this purpose, the rotor body 40 comprises a corresponding toothing at its inner circumference.

At 50, a shaft toothing portion designed as a tooth gap of the first shaft toothing 44 is shown, which corresponds in the present case to a tooth of the second shaft toothing 48 and is aligned in circumferential direction with a permanent magnet 42. To be more precise, the shaft toothings 44, 48 comprise a plurality of such shaft toothing portions 50 that are distributed over the circumference and which are aligned in each case in circumferential direction with one of the permanent magnets 42. The shaft toothing portions 52 are arranged in each case between the shaft toothing portions 50, wherein the shaft toothing portions 52 are formed by a tooth of the first shaft toothing 44 and a tooth gap of the second shaft toothing 48. These second shaft toothing portions 52 are arranged in each case in circumferential direction between two permanent magnets 42. Accordingly, the shaft toothings 44, 48 comprise a toothing pitch T which is identical to the rotor pitch T as is shown in FIG. 4. The first shaft toothing portions 50 and the second shaft toothing portions 52 have the same length in circumferential direction, wherein the shaft toothing portions 50, 52 have in each case approximately the same circumferential length as a permanent magnet 42.

During operation of the electrical machine 30, a magnetic flux through the rotor body 40 is established, as is shown at 54 in FIG. 4. To be more precise a magnetic flux 54 between adjacent permanent magnets is established (in each case from a north pole to a south pole or vice versa), which magnetic flux extends from the poles of adjacent permanent magnets 42 in an approximately arcuate shape radially to the inside. Due to the fact that the second shaft toothing comprises a tooth gap 52 in the area between the two permanent magnets 42 (seen from the rotor body 40), the arcuate-shaped magnetic flux distribution 54 can extend into the tooth gap 52. Here, it can be essentially avoided that magnetic flux 54 crosses tooth flanks of the shaft toothing 48. Further, the radial distance between the permanent magnets 42 and the disk carrier 45 can be made relatively short hereby so that the electrical machine 30, on the whole can be of compact design in radial direction.

As an alternative to the embodiment shown in FIGS. 5 and 4, it is also possible to design the rotor body 40 without an inner shaft toothing. In this case, the rotor body 40 would be connected in a different manner in circumferential direction with the disk carrier 45. However, the magnetic flux 54 could extend also in this case into the tooth gaps 52 of the second shaft toothing 48, even if either no body at all or a body made of a different material is present in the tooth gaps 52.

It is further possible in the embodiment shown in FIGS. 4 and 5 that the magnetic flux extends in an area of the tooth gaps 52 into the disk carrier 45. The disk carrier 45 is typically made of a metallic material, particularly preferred of a ferromagnetic material, so that this arrangement typically does not bring about significant losses. Here, the design can be made even more compact in radial direction.

Further, it is shown in FIGS. 4 and 5 that the first clutch part 24, which includes the disk carrier 45 and the clutch disks 46 comprises an axial channel 56, which is adapted to guide a fluid in axial direction in an area of the inner circumference of the rotor body 40. In the present case, the axial channel 56 is formed at the teeth of the shaft toothing of the clutch disks 46. To be more precise, each clutch disk 46 comprises in an area of a tooth, a semi-circular recess which preferably does not extend in radial direction beyond the bottom land of the shaft toothing of the clutch disks 46. In addition, the length of axial channel 56 in circumferential direction is preferably maximally half the circumferential length of the respective associated tooth of the shaft toothing of the clutch disks 46. It is ensured hereby that sufficiently high forces can be transferred in circumferential direction between the disk carrier 45 and the clutch disks 46.

The arrangement shown in FIGS. 4 and 5 and comprising a clutch arrangement 16 having the design of a multi-disk clutch is particularly adapted for use in motor vehicles, and is further designed as a so-called wet-running multi-disk clutch. In this type of multi-disk clutch, a fluid (e. g. ATF oil) is supplied from radially inside in a direction radially to the outside, in order to cool the disks and hence in order to remove friction heat that can be generated particularly during a slipping operation. The fluid arrives in radial direction between the clutch disks 56 and is pressed due to centrifugal forces radially to the outside against the inner circumference of the disk carrier 45. Due to these forces, the fluid is subsequently guided essentially along the entire axial length of the rotor body 40 in the axial channels 56 at the inner circumference of the disk carrier 45 so that efficient cooling of the rotor body 40 can be achieved.

An alternative embodiment is shown in FIG. 4 at 56', wherein an axial channel 56' is formed at an inner circumference of a tooth gap of the shaft toothing of the clutch disks 46. This arrangement of an axial channel 56' can be provided as an alternative or in addition to the axial channel 56. However, the arrangement of an axial channel 56 in the area of a tooth has the advantage that cooling fluid can be brought closer to the rotor body 40 in the radial direction.

As an alternative, or in addition to the axial channels 56, 56' in the clutch disks 46, it is also possible to form such an axial channel by a corresponding longitudinal recess in the disk carrier 45 itself, as will be shown in an embodiment below.

As has been mentioned above, it is possible to connect the rotor body 40 in a different manner with the disk carrier 45 and to form the rotor body 40 in this case without shaft toothing at its inner circumference. In this case, the tooth gaps 52 of the second shaft toothing 48 remain free of material and can be used also for guiding fluid in the axial direction, if openings in the disk carrier 45 are correspondingly formed.

In the above embodiments, the axial channel 56 serves essentially for cooling the rotor 32.

Figure 6:
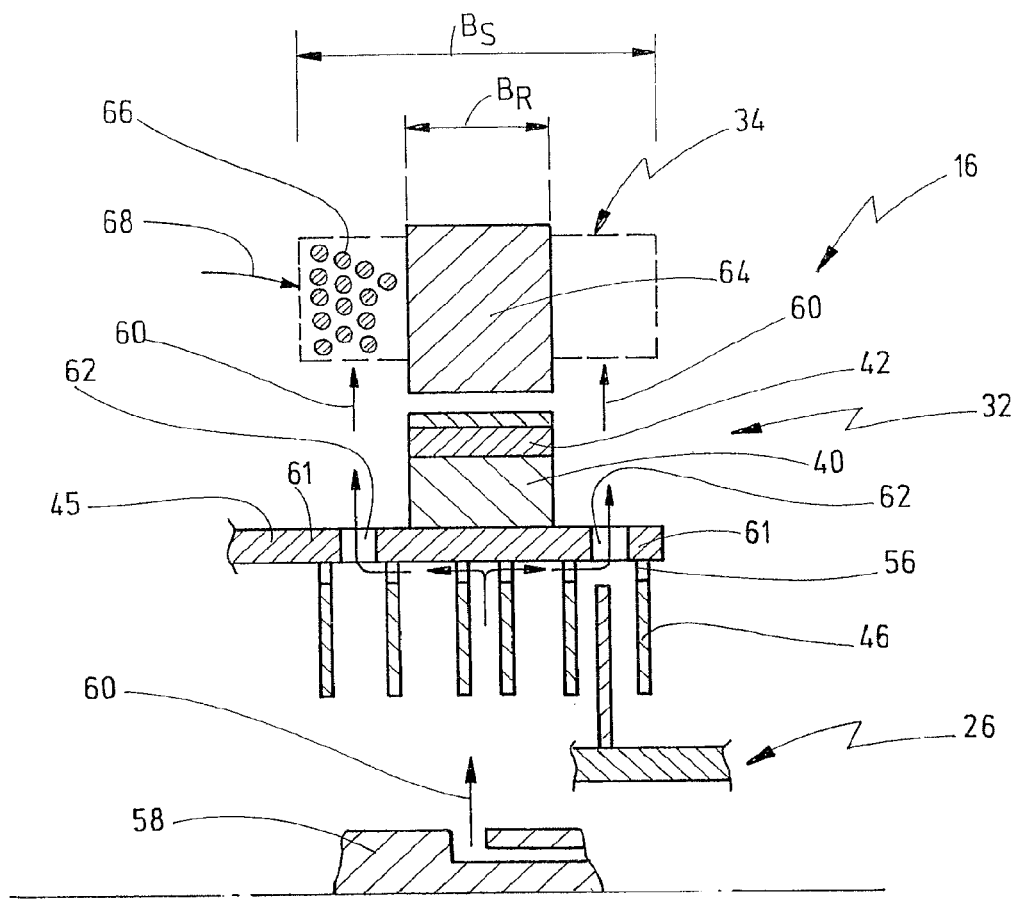
FIG. 6 is a schematic longitudinal sectional view of a clutch and of an electrical machine for an inventive drive train.

In FIG. 6 it is shown schematically how such fluid can also be used for cooling the stator 34.

FIG. 6 shows schematically a fluid-supply device 58, by means of which fluid 60 can be supplied to the clutch arrangement 16 from radially inside in a direction radially to the outside. The disk carrier 45 of the first clutch part 24 is designed in this embodiment as an outer disk carrier and carries a plurality of clutch disks 46 which extend radially to the inside. Correspondingly, the second clutch part 26 comprises an inner disk carrier which is not denoted in detail and from which a plurality of clutch disks extends radially to the outside, which are not denoted in detail. For the purpose of a clear representation, the construction of the second clutch part 26 is only roughly shown. The fluid, which is supplied from the radial inside to the radial outside, enters an area between the clutch disks 46 (to this purpose a plurality of openings is typically provided in the disk carrier of the second clutch part 26) and impinges here at the inside of the disk carrier 45. The fluid is guided by means of the axial channel 56 in axial direction along the inside of the disk carrier 45 and cools the rotor body 40 over its entire axial length.

The rotor 32, including the rotor body 40 and the permanent magnets 42 embedded therein, has a width BR which is smaller than the width BS of the stator 34. On the other hand, the disk carrier 45 also comprises a larger width than the rotor body 40 and correspondingly comprises on the axially opposing sides of the rotor body 40 in each case protruding portions

61. At least one opening 62 is provided in each case in the protruding portions 61, which penetrates the disk carrier 45 radially. The fluid 60, which is pressed due to centrifugal forces in the axial direction to the outside, arrives hence in the openings 62 and is thrown radially to the outside during operation of the clutch arrangement 16 due to the centrifugal forces. Here, the fluid 60 impinges against the radial inside of the stator 34. The stator 34 comprises a stator body 64 made of a ferromagnetic material, the width of which may essentially correspond to the width of the rotor 32. A plurality of stator coils 66 is arranged at the stator body 64, wherein the stator coils 66 comprise so-called coil heads 68 at axially opposing portions, i.e. at locations at which the windings of the coils are redirected. During operation of the machine 30, local heat maxima occur in the area of the coil heads 68.

The openings 62 are preferably aligned in radial direction with the coil heads 68 so that fluid 60 enters through the openings 62, impinges at the inside of the coils heads 68. Thus, the fluid 60 is used in the present case also for cooling the stator 34, particularly the coil heads 68 thereof.

The formation of openings 62 in a protruding portion of the disk carrier 45 that forms a rotor shaft for the rotor 32, may, for the purpose of cooling the stator 34, be provided independent from the formation of the axial channel 56. Measures can be taken in order to supply the fluid from the fluid-supply device 58 in radial direction directly to the openings 62.

In the following FIGS. 7 to 10, further embodiments of parts of hybrid drive trains and electrical machines are shown, which generally correspond in terms of design and mode of operation to the embodiments explained above. The same elements are therefore denoted by the same reference numerals. In the following, essentially the differences will be explained.

Figure 7:
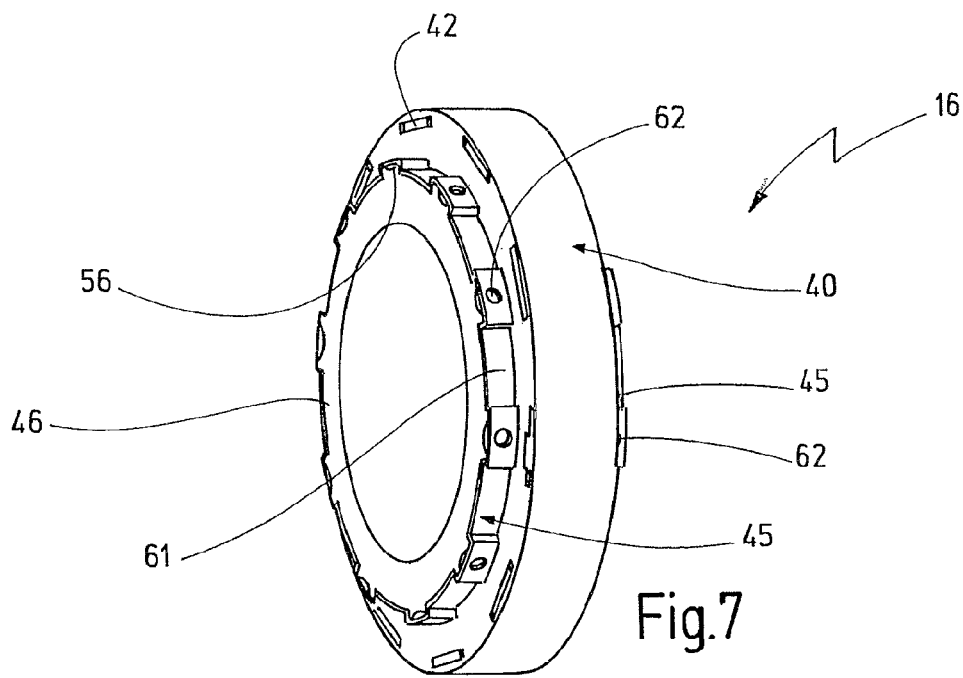
FIG. 7 is a perspective view of a further part of a clutch and of a rotor of an electrical machine for an inventive drive train.

FIG. 7 shows a perspective view of an arrangement that can be compared to FIGS. 4 and 5, wherein it is clearly shown that the disk carrier 45 comprises portions 61 that protrude in axial direction, wherein openings 62 for cooling the stator 34 are provided in the protruding portions 61. Here, the openings 62 are arranged radially on the outside of the axial channels 56.

Figure 8:
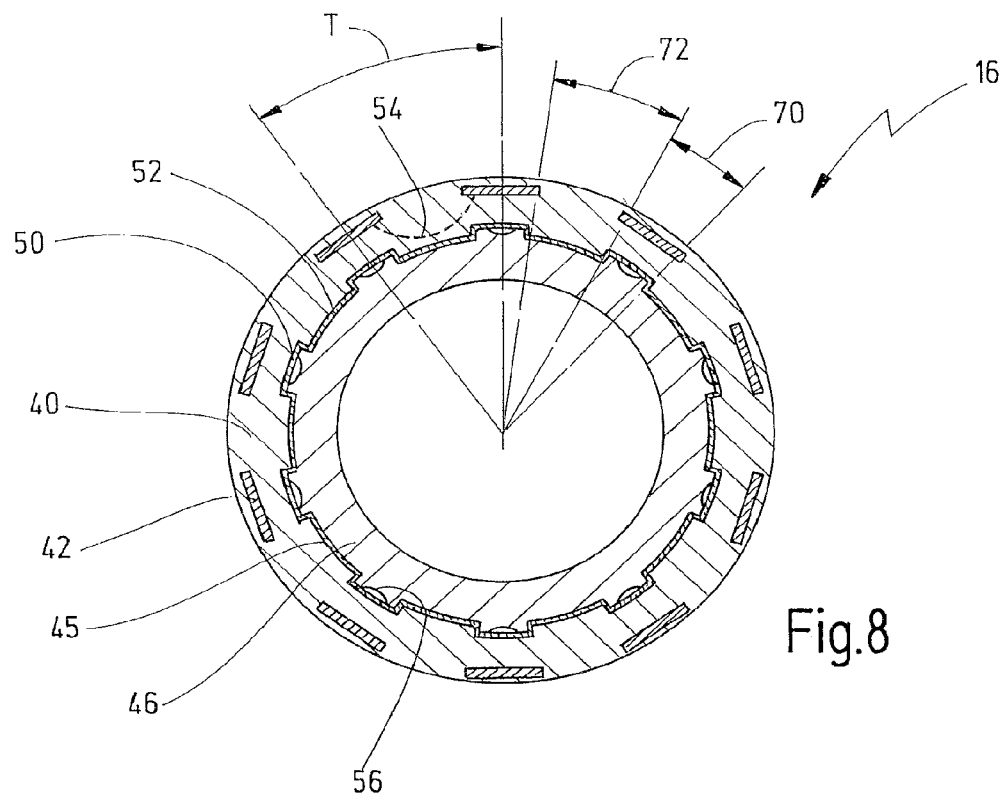
FIG. 8 is a depiction, comparable to FIG. 5, of a part of a clutch and of a rotor of an electrical machine for an inventive drive train.

FIG. 8 depicts an alternative embodiment, wherein the toothings 44, 48 of the disk carrier 45 are arranged such that shaft toothing portions 52 between adjacent permanent magnets 42 have a circumferential length 72 that is larger than a circumferential length 70 of shaft toothing portions 50 that are aligned radially with the permanent magnets 42. What can be achieved hereby is that the magnetic flux 54 between adjacent permanent magnets 42 can be guided past flanks of the shaft toothing 44, 48 in an even more undisturbed manner. The circumferential lengths 70 of the shaft toothing portions 50 are here preferably smaller than the circumferential lengths of the associated permanent magnets 42.

Figure 9:
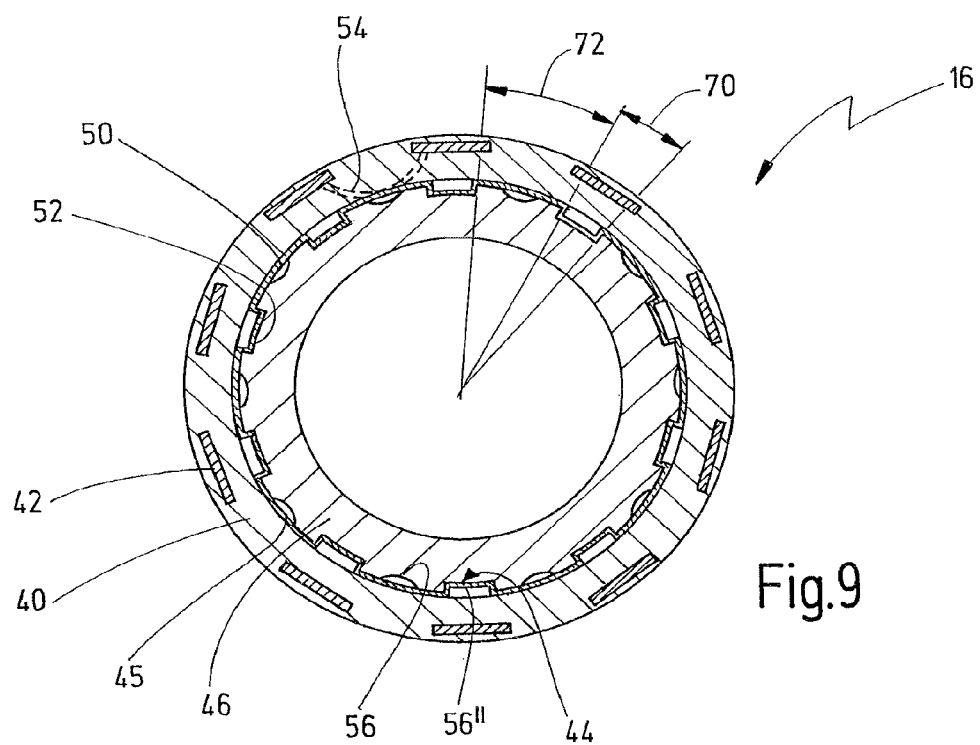
FIG. 9 is a depiction, comparable to FIG. 5, of a further modified embodiment of a part of a clutch and of a rotor.

FIG. 9 shows an alternative embodiment, wherein the rotor body 40 does not comprise a shaft toothing at its inner circumference and is connected in circumferential direction with the disk carrier 45 in a different manner (e.g. by pressing on or the like). Here, voids are created in the area of the shaft toothing portions 52 which are aligned with the permanent magnets 42, which voids can be used as axial channel 56". To this purpose, through openings can be provided in the disk carrier 45 at a suitable location, which through openings connect the inner side of the disk carrier 45 with the axial channels 56".

It is further shown in FIG. 9 that, in contrast to the above embodiments, shaft toothing portions in the shape of tooth gaps 52 of the first shaft toothing 44 are aligned in circumferential direction with the permanent magnets 42. Correspondingly, toothing portions 50 in the shape of teeth of the first shaft toothing 44 are arranged in an area between the two adjacent permanent magnets 42.

What can be identified here is that the magnetic flux between adjacent permanent magnets 42 is not only guided through the rotor body 40 but also at least partially through the shaft toothing portions 50 arranged therebetween. A radially compact design can be achieved also with this construction. Although the circumferential lengths 70, 72 of the toothing portions 50, 52 can be equal, it is preferred, as in the embodiment of FIG. 8, if the shaft toothing portions 50 arranged between the permanent magnets 42 have a larger circumferential length than the shaft toothing portions 52 aligned with the permanent magnets 42.

Figure 10:
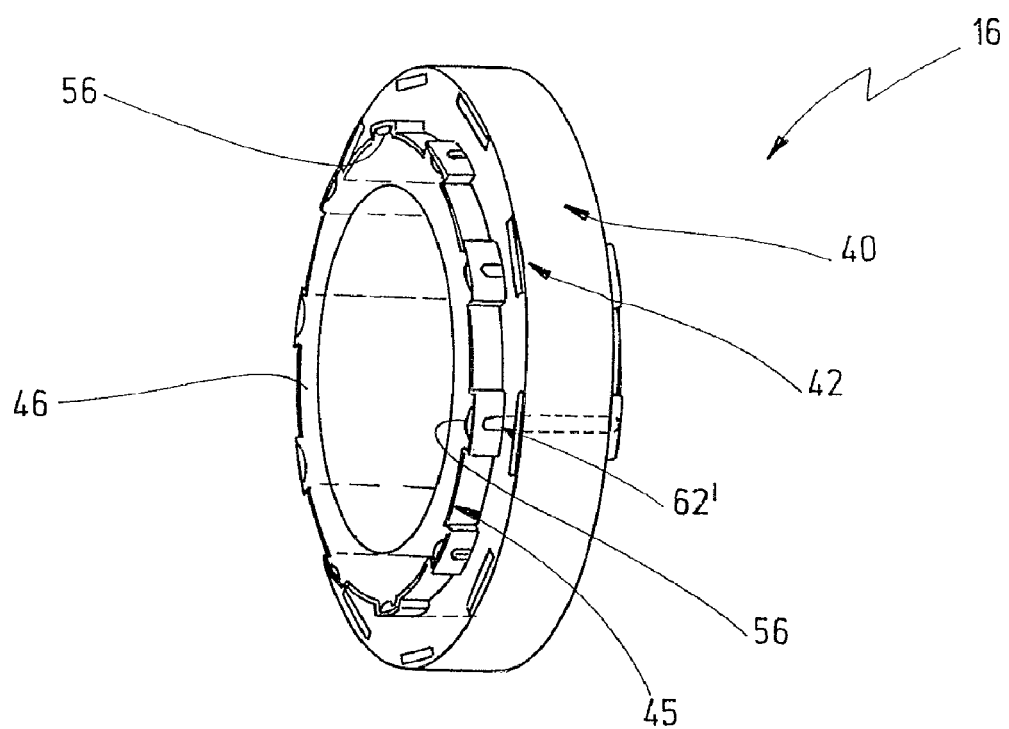
FIG. 10 is a perspective depiction corresponding to FIG. 7 of a further embodiment of an arrangement shown in FIG. 7.

FIG. 10 shows a further embodiment, wherein longitudinal holes 62' which extend in axial direction are arranged in the disk carrier 45, wherein the longitudinal holes 62' are aligned in radial direction with the axial channels 56. The longitudinal holes 62 serve hence for having direct fluid flow against the inner side of the rotor body 40, and include on the other hand also the openings 62, via which the stator 34 can be cooled with fluid.

The invention claimed is:

1. Hybrid drive train for a motor vehicle, comprising a clutch arrangement having a first rotatable clutch part and a second rotatable clutch part which clutch parts can be separated from one another and can be connected to one another, and comprising an electrical machine which is arranged concentrically with respect to the first clutch part and has a rotor wherein the rotor is connected with the first clutch part and comprises a plurality of magnetic flux influencing portions, the magnetic flux influencing portions being arranged distributed over the circumference of the rotor with a predetermined rotor pitch, wherein the first clutch part comprises a shaft toothing that is adapted to the rotor pitch.

2. Hybrid drive train according to claim 1, wherein the ratio of a toothing pitch of the shaft toothing to the rotor pitch is an integer number.

3. Hybrid drive train according to claim 2, wherein the ratio of the toothing pitch to the rotor pitch is 1.

4. Hybrid drive train according to claim 1, wherein the ratio of a circumferential length of shaft toothing portions that are aligned in a circumferential direction with a respective magnetic flux influencing portion, to a circumferential length of shaft toothing portions that are arranged in the circumferential direction between adjacent magnetic flux influencing portions, is chosen such that a magnetic flux from one magnetic flux influencing portion to an adjacent magnetic flux influencing portion is guided essentially past tooth flanks of the shaft toothing.

5. Hybrid drive train according to claim 1, wherein the ratio of a circumferential length of shaft toothing portions that are aligned in a circumferential direction with a magnetic flux influencing portion, to a circumferential length of shaft toothing portions that are arranged in the circumferential direction between respective adjacent magnetic flux influencing portions, is in the range from 45:55 to 20:80.

6. Hybrid drive train according to claim 1, wherein the magnetic flux influencing portions and the shaft toothing are arranged with respect to each other in circumferential direction such that a magnetic flux from one magnetic flux influencing portion to an adjacent magnetic flux influencing portion is guided essentially exclusively through a rotor body of the rotor.

7. Hybrid drive train according to claim 1, wherein the magnetic flux influencing portions and the shaft toothing are arranged with respect to each other in the circumferential direction such that a magnetic flux from a magnetic flux influencing portion to an adjacent magnetic flux influencing portion is guided at least partially through a circumferential portion of the first clutch part, which is arranged between the magnetic flux influencing portions.

8. Hybrid drive train according to claim 7, wherein the circumferential portion of the first clutch part, which guides the magnetic flux, is a tooth of the shaft toothing.

9. Hybrid drive train according to claim 1, wherein the first clutch part comprises at least a channel that extends in an axial direction and via which a fluid can flow against at least a portion of the electrical machine.

10. Hybrid drive train according to claim 1, wherein the first clutch part comprises at least one opening which is continuous in the radial direction and via which a fluid can flow against at least a portion of the electrical machine.

11. Hybrid drive train for a motor vehicle, comprising a clutch arrangement having a first rotatable clutch part and a second rotatable clutch part, which clutch parts can be separated from one another and can be connected to one another, and comprising an electrical machine which is arranged concentrically with respect to the first clutch part and has a rotor wherein the rotor is connected with the first clutch part and comprises a plurality of magnetic flux influencing portions, the magnetic flux influencing portions being arranged distributed over the circumference of the rotor with a predetermined rotor pitch, wherein the first clutch part comprises at least a channel that extends in an axial direction and via which a fluid can flow against at least a portion of the electrical machine.

12. Hybrid drive train for a motor vehicle, comprising a clutch arrangement having a first rotatable clutch part and a second rotatable clutch part, which clutch parts can be separated from one another and can be connected to one another, and comprising an electrical machine which is arranged concentrically with respect to the first clutch part and has a rotor wherein the rotor is connected with the first clutch part and comprises a plurality of magnetic flux influencing portions, the magnetic flux influencing portions being arranged distributed over the circumference of the rotor with a predetermined rotor pitch, wherein the first clutch part comprises at least one opening which is continuous in the radial direction and via which a fluid can flow against at least a portion of the electrical machine.

13. Hybrid drive train according to claim 12, wherein the first clutch part comprises at least a channel that extends in an axial direction and via which a fluid can flow against at least a portion of the electrical machine, and wherein the first clutch part comprises at least one opening which is continuous in the radial direction and via which a fluid can flow against at least a portion of the electrical machine and wherein the opening is connected to the channel.

14. Hybrid drive train according to claim 10, wherein the first clutch part protrudes with respect to the rotor in the axial direction, at least on one side thereof, wherein the opening, via which fluid can flow against stator of the electrical machine, is arranged in the protruding portion.

15. Hybrid drive train according to claim 1, wherein the clutch is a multi-disk clutch, wherein the first clutch part comprises an outer disk carrier of the multi-disk clutch, wherein the outer disk carrier is connected in a circumferential direction to the rotor via a shaft toothing.

16. Electrical machine having an outer stator and an inner rotor, wherein the rotor is coupled in a circumferential direction to a rotor shaft, wherein the stator has a larger width in an axial direction than the rotor, wherein the rotor shaft protrudes at least on one side in the axial direction with respect to the rotor, wherein at least one radially continuous opening is formed in the protruding portion of the rotor shaft, wherein fluid can flow via the opening against the stator.

* * * * *

UNITED STATES PATENT AND TRADEMARK OFFICE
CERTIFICATE OF CORRECTION

| | | |
|---|---|---|
| PATENT NO. | : 8,274,186 B2 | Page 1 of 1 |
| APPLICATION NO. | : 12/832007 | |
| DATED | : September 25, 2012 | |
| INVENTOR(S) | : Uli Christian Blessing et al. | |

It is certified that error appears in the above-identified patent and that said Letters Patent is hereby corrected as shown below:

On the Title Page

Page 1 (item 73, Assignee), change "GETRAG Getriebe- und Zahnradfabrik Hermann Hagenmeyer GmbH & Cie KG, Untergruppenbach (DE)" to --GETRAG Getriebe- und Zahnradfabrik Hermann Hagenmeyer GmbH & Cie KG, Untergruppenbach (DE); GETRAG FORD Transmissions GmbH, Koeln (DE)--.

Signed and Sealed this
Second Day of June, 2015

Michelle K. Lee
*Director of the United States Patent and Trademark Office*